United States Patent
Herranen et al.

(12) 
(10) Patent No.: US 6,348,893 B1
(45) Date of Patent: Feb. 19, 2002

(54) ANTENNA STRUCTURE OF AN EXPANSION CARD FOR AN ELECTRONIC DEVICE

(75) Inventors: Timo Herranen, Viiala; Saku Lahti, Tampere; Simo Vapaakoski, Tampere; Lauri-Pekka Alanko, Tampere, all of (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/565,856

(22) Filed: May 5, 2000

(30) Foreign Application Priority Data

May 7, 1999 (FI) .................................................. 991055

(51) Int. Cl.[7] .............................................. H01Q 1/24
(52) U.S. Cl. ...................................... 343/702; 343/720
(58) Field of Search .......................... 343/702, 700 MS, 343/720; 361/736, 737; 455/90; H01Q 1/38, 1/24

(56) References Cited

U.S. PATENT DOCUMENTS

| | | | |
|---|---|---|---|
| 5,361,061 A | 11/1994 | Mays et al. ............ | 340/825.44 |
| 5,373,149 A | 12/1994 | Rasmussen .................. | 235/492 |
| 5,583,521 A | 12/1996 | Williams ..................... | 343/702 |
| 5,606,732 A * | 2/1997 | Vignone ...................... | 343/702 |
| 5,628,055 A | 5/1997 | Stein ............................ | 455/89 |
| 5,809,115 A | 9/1998 | Inkinen .................... | 379/93.05 |
| 5,828,346 A * | 10/1998 | Park ........................... | 343/702 |
| 5,898,413 A | 4/1999 | Mandai et al. .............. | 343/895 |

FOREIGN PATENT DOCUMENTS

| | | |
|---|---|---|
| DE | 19614 979 A1 | 10/1996 |

* cited by examiner

*Primary Examiner*—Michael C. Wimer
(74) *Attorney, Agent, or Firm*—Perman & Green, LLP

(57) ABSTRACT

The present invention relates to a wireless communication card device, which is for example a standardized expansion card for an electronic device, and which card (CP) comprises at least a cover surface (1) and a bottom surface (2) as well as a frame structure (3) placed therebetween and edging said card (CP), and which card (CP) further comprises at least an antenna structure (ANT). Said antenna structure (ANT) is integrated in said frame structure (3). The antenna structure (ANT) can be arranged primarily on the outer surface (3a) of said frame surface structure (3). The card can be for example a PCMCIA or CF card.

15 Claims, 5 Drawing Sheets

ANTENNA STRUCTURE OF AN EXPANSION CARD FOR AN ELECTRONIC DEVICE

BACKGROUND OF THE INVENTION

1. Field of the Invention

The present invention relates to a wireless communication card device according to the preamble of claim 1. The invention also relates to a method in the manufacture of an expansion card for an electronic device according to the preamble of claim 7. Further, the invention relates to an expansion card for an electronic device according to the preamble of claim 9.

2. Brief Description of Related Developments

According to prior art, various electronic devices, such as portable personal computers (PC) are often equipped with an expansion card interface, to which a standardized expansion card can be connected. These expansion cards are intended to form a functional unit with the PC. The expansion cards may also contain radio parts of a wireless communication device with its antenna, wherein the PC can, by means of this card-like wireless communication device, communicate with other devices or with a communication network, e.g. the GSM network (Global System for Mobile Communication). The antennas are used for the transmission and reception of radio-frequency signals, and the signals are transmitted between the radio part and the antenna of the wireless communication device by means of conventional wiring and connections.

One known expansion card is the PC card according to the PCMCIA standard (Personal Computer Memory Card International Association). The PC cards are adapted to be fully inserted in the PC, but so-called extended PC cards are longer than ordinary PC cards. These extended PC cards are partly placed outside the PC, wherein the thickness and design of the PC cards can vary in this part to be placed outside the PC. In a way known per se, this part also accommodates the separate antenna for the wireless communication device.

One known wireless communication card device which comprises a transceiver with its antenna is the Nokia Cellular Card Phone, i.e. a card phone that can be connected to expansion card interfaces of types II and III of the PC card complying with the PCMCIA standard. One embodiment of the card phone of prior art is shown in FIG. 1, and the operation of the card phone is described in more detail e.g. in patent publication U.S. Pat. No. 5,809,115. In the card phone, the antenna part comprising the antenna is placed outermost in the part located outside the PC device, this part being connected to the card part of the card phone that is placed at least partly inside the expansion card interface. Other known wireless communication card devices are disclosed in patent publication U.S. Pat. No. 5,628,055, wherein a separate turnable antenna can be connected to the end of the card, and U.S. Pat. No. 5,361,061, wherein a foldable antenna is pivoted at the end of the extended card on its upper surface.

Other known expansion cards include e.g. a so-called CompactFlash (CF) card complying with the CFA standard (Compact Flash Association). For example for these CF cards, there are also adapters of the size of the PCMCIA card, in which the CF card is placed for the PCMCIA interface. Also known are expansion cards for a wireless local area network (WLAN). Other expansion cards include also a so-called Miniature Card, whose size is only 38 mm×33 mm×3.5 mm, as well as a so-called SmartMedia card, whose size is only 45 mm×37 mm×0.76 mm, and a MMC card (so-called MultiMediaCard), whose size is only 32 mm×24 mm×1.4 mm.

One drawback in known communication card devices is the fact that during the use, particularly the antenna structure constitutes a part that protrudes from both the electronic device and the card. The protruding part of the antenna structure may stick in something particularly during the transportation and use of the device and may damage the card. For this reason, the card must be detached after the use and be stored separately from the device.

It is an aim of the present invention to eliminate abovementioned drawbacks by means of a wireless communication card device according to the invention. The card wireless communication device of the invention is characterized in what will be presented in the characterizing part of claim 1. The method for manufacturing an expansion card for an electronic card according to the invention is characterized in what will be presented in the characterizing part of claim 7. An expansion card for an electronic device according to the invention is characterized in what will be presented in the characterizing part of claim 9.

The essential principle of the invention is to integrate the wireless communication device with its antenna in the card, particularly to integrate the antenna structure in the part edging the card, preferably on the outer surface of one end of the card. The wireless communication card device preferably constitutes an integrated unit of standardized dimensions. Thanks to the integrated antenna, no separable or detached parts are formed in the structure of the card, wherein no easily sticking or detachable parts are formed even in an extended card.

SUMMARY OF THE INVENTION

The card of the invention does not need to be removed from the electronic device for the time of transportation. Thus, it will be easier to start to use the device and the card, and the card does not need to be stored separately from the device. Also, the insertions and detachments of the card into and from the connection will be reduced, which will reduce the wear and damaging of the connection.

Another significant advantage of the wireless communication card device according to the invention is the fact that the antenna is ready for use without the user installing, moving or turning the antenna into an optimal position for the operation.

The invention is applicable for use particularly in electronic devices which are suitable for wireless networks of low power radio frequency (LPRF); the uses being wireless local area networks such as piconets, wherein the working distance is normally from 0.1 to 10 m, even 100 m if necessary. These wireless networks operate well in the ISM range at the frequency of 2.4 Ghz. The invention can be well applied in so-called Bluetooth technology, which can be used to replace cables by the radio channel e.g. between PC devices and peripheral devices.

The different parts of the card including the antenna structure can be produced by methods known per se e.g. in connection with injection moulding.

BRIEF DESCRIPTION OF THE DRAWINGS

In the following, the invention will be described in more detail with reference to the appended drawings, in which

FIG. 2 shows an expansion card according to a first preferred embodiment of the invention, which is a wireless communication card device CP and which is a PC card complying with the PCMCIA standard. According to the PCMCIA standard, the length L of the PC card is 85.6 mm and the width W is 54 mm. PC cards are divided into three types, wherein the thickness T of the PC card can be 3.3 mm (type I), 5.0 mm (type II) or 10.5 mm (type III). PC cards are designed to be fully inserted in the PC by a movement in the direction of the longitudinal axis X of the PC card, but so-called extended PC cards can be even 40 mm longer than ordinary PC cards. The PC card is equipped with a 68-pin connector P, which is used to connect the PC card with e.g. a PC. The connector P is provided at the end of the PC card in a frame structure 3 edging the PC card.

DETAILED DESCRIPTION OF THE PREFERRED EMBODIMENT(S)

Figure 1:
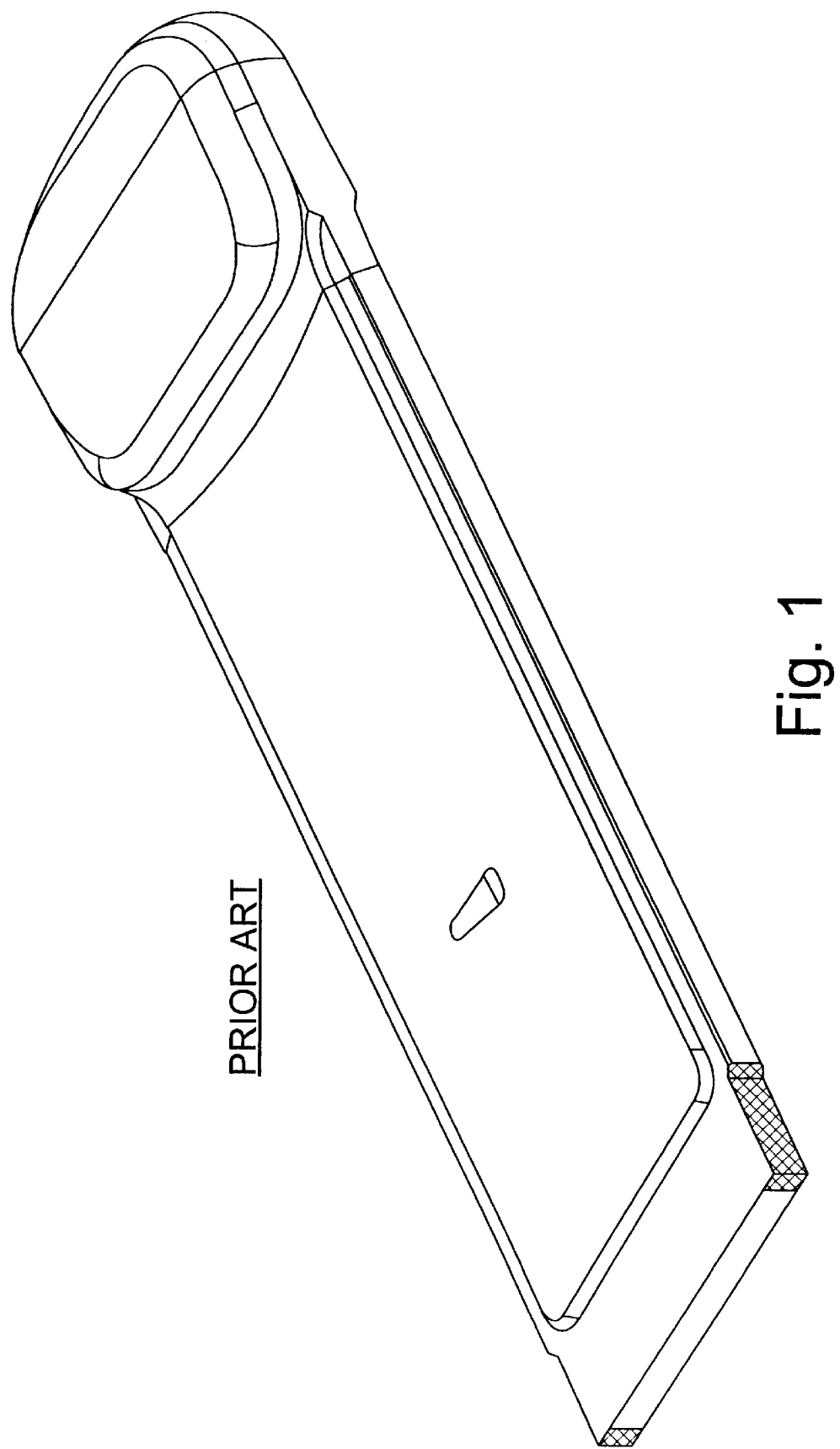
FIG. 1 shows a wireless communication card device according to prior art in a perspective view.
Figure 2:
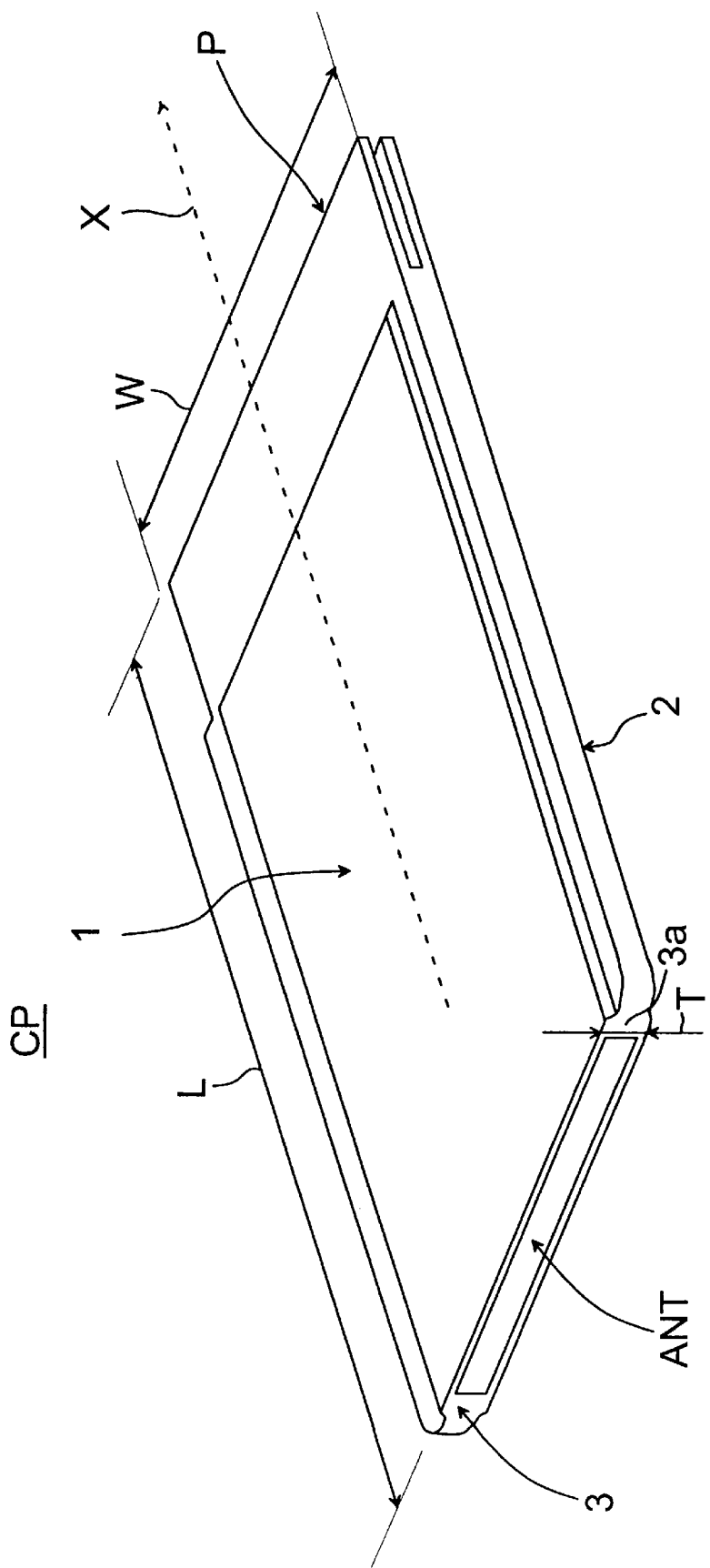
FIG. 2 shows a first preferred embodiment of the wireless communication card device according to the invention in a perspective view.

With reference to FIG. 2, the connector P is normally fixed to a circuit board (not shown in the figure) placed inside the PC card, the circuit board being also provided with the components (e.g. IC) necessary for the functions and the wirings for the transmission of electrical signals between the components. The PC card usually comprises a first cover surface 1, a bottom surface 2 and a frame structure 3 which at least partly forms an outer surface 3a enclosing the PC card on all sides and being simultaneously substantially perpendicular to the surfaces 1 and 2. The rim outer surface 3a consists of four straight outer surfaces located substantially at a right angle in relation to each other. In the PC card, the connector P, the circuit board, the frame structure 3, and the cover structures forming the cover surface 1 and the bottom surface 2 are normally formed of a thin metal sheet with a substantially standard thickness. The connector P and the frame structure 3 are usually at least partly of plastic, such as polyethylene (PE). It is obvious that the frame structure 3 can comprise several separate parts, the connector P also constituting a part of the frame structure 3. It is also obvious that the design of the cover structures and their attachment to the frame structure 3 can vary. Moreover, the cover structures can partly form the outer surface 3a when they extend on top of the frame structure 3.

In FIG. 2, according to the invention, the antenna structure ANT of the wireless communication card device CP is integrated in the frame structure 3 of the PC card and primarily placed at the end of the PC card on the outer surface 3a of the frame structure. In relation to the connector P, the antenna structure ANT is located at the opposite end of the PC card which is left exposed in the open expansion card interface of the electronic device. The antenna structure ANT is transverse to the longitudinal direction X and parallel to the outer surface 3a.

The antenna structure ANT can be e.g. a monopole antenna, wherein the antenna structure ANT constitutes an integrated elongated structure which is supplied at its one end and whose length is e.g. one quarter of the wavelength. The antenna circuit can also comprise an electric matching circuit to match the impedance of the antenna. The monopole antenna can be designed partly as a helix antenna, wherein the wire is twisted right-handed or left-handed, and wherein a shorter antenna structure is achieved. The antenna structure ANT can also be a T-antenna which is supplied at a suitable location and whose length is e.g. a half of the wavelength. The antenna structure ANT can be e.g. an inverted-F antenna (IFA), wherein it constitutes an integrated unit which is at its one side shorted out to the ground plane with a wire, and a radio-frequency signal is supplied to a suitable location in the antenna. Other possible antenna structures ANT include a slot antenna, in which the ground plane placed on a dielectric layer is provided with slots, and the signal is supplied to a suitable location. The antenna structure can have a wire, plate or strip shape, and it can also extend from the outer surface 3a deeper into the frame structure 3, wherein it is possible to form integrated antenna structures of different sizes and shapes, but the outer dimensions of the card do not exceed e.g. the determined standard dimensions. Furthermore, it is obvious that the antenna structure ANT can be coated or protected with thin covering protective layers, and that the antenna structure can be placed deeper in shield inside the frame structure 3.

Figure 4A:
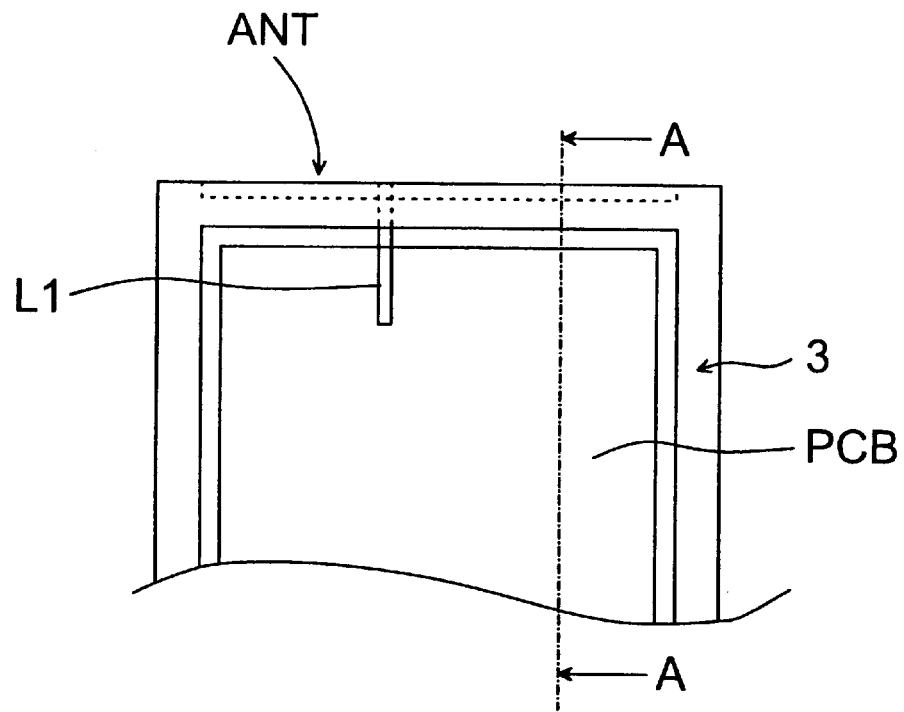
FIGS. 4a–4d show, in principle views, some details of cards according to the invention, the cards being partly opened and seen from above and from the side.
Figure 4B:
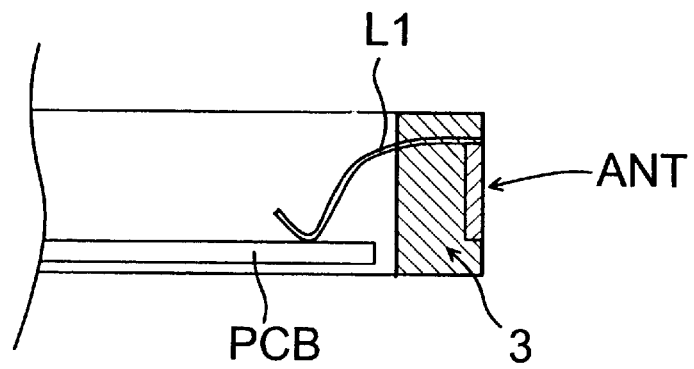
Figure 4C:
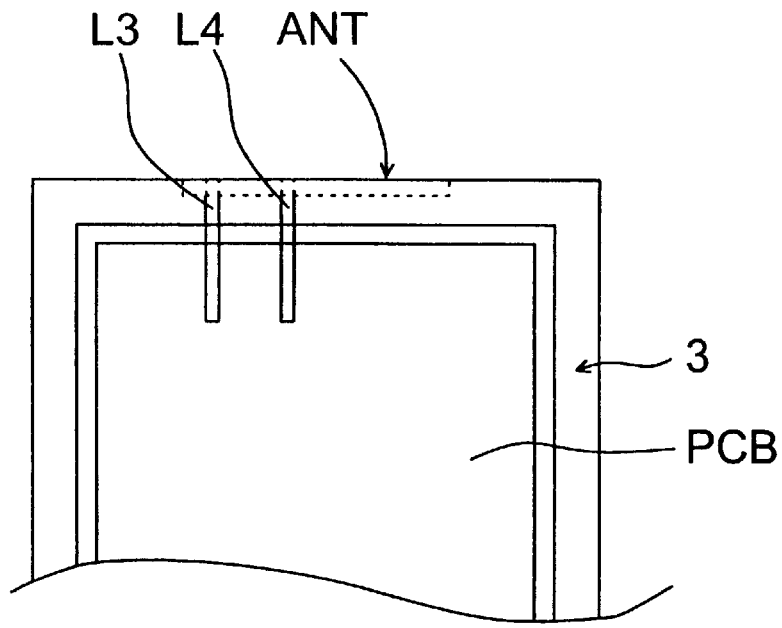
Figure 4D:
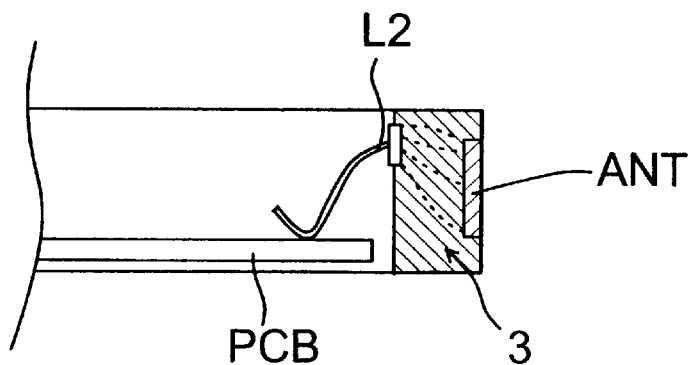

Further with reference to FIG. 2, the antenna structure ANT can also be a small-sized, e.g. rectangular dielectric resonator antenna which is integrated in the frame structure and which is supplied e.g. in a way shown in FIG. 4d. The antenna structure ANT can also be a terminated transmission line antenna which can be, for example, a half-wave antenna implemented with microstrips on top of a dielectric layer placed on the ground plane. It is obvious that if the dimensions of the antenna structure ANT allow it, two or more antennas can be integrated in the frame structure 3 of the card, preferably at the end of the card CP, wherein they are placed in sequence or in parallel.

Figure 3:
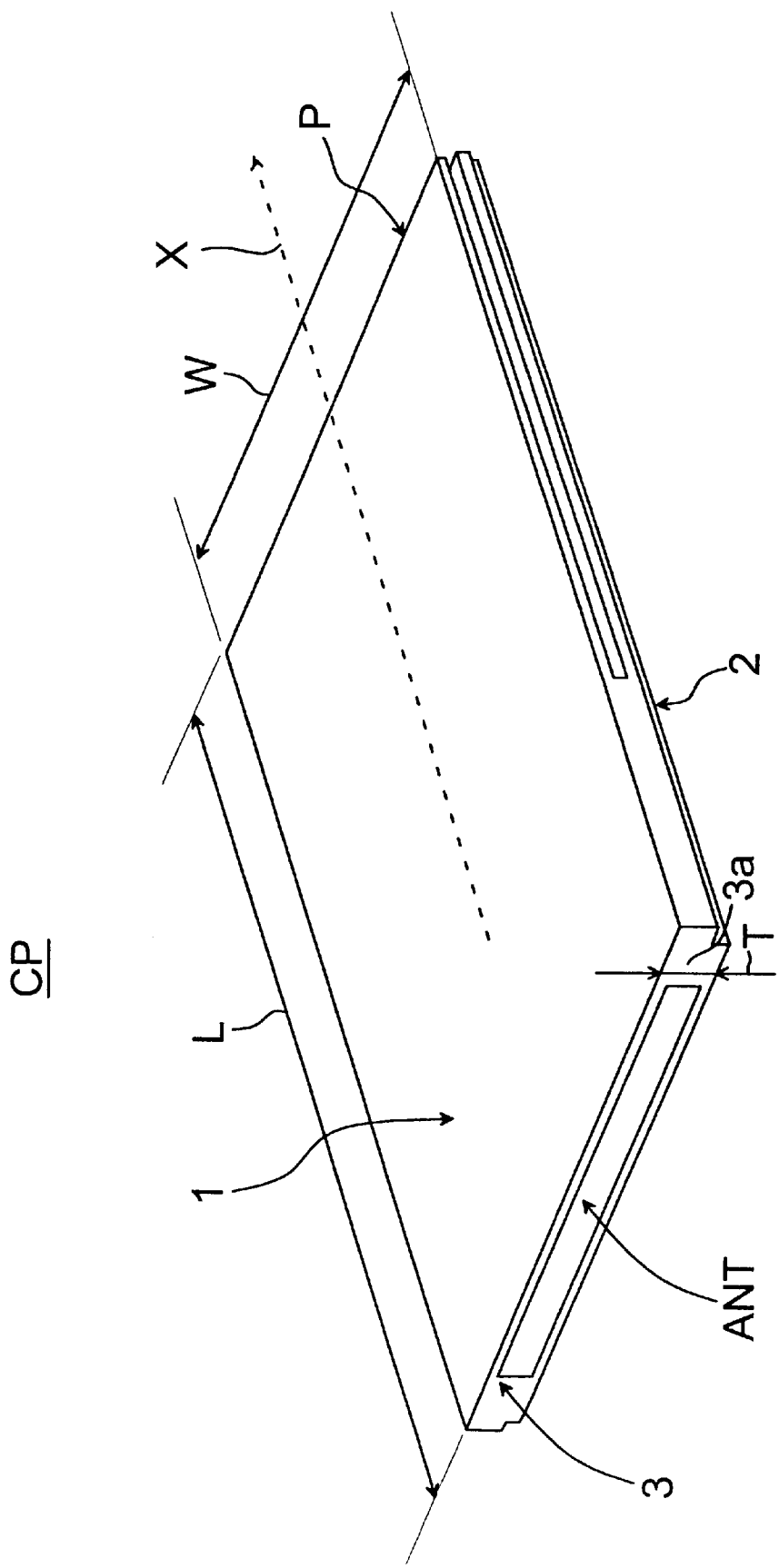
FIG. 3 shows a second preferred embodiment of the wireless communication card device according to the invention in a perspective view.

FIG. 3 shows an expansion card according to a second preferred embodiment of the invention, which is a wireless communication card device CP and which is a CF card complying with the CFA standard. The length L of the CF card is 42.8. mm, the width W is 36.4 mm and the thickness T is 3.3 mm (type I) or 5 mm (type II). The references and numerals of FIG. 3 also refer to the parts of FIG. 2 and to the description above. It is obvious that the frame structure 3 can comprise several separate parts and the connector structure P can simultaneously constitute a part of the frame structure 3. It is also obvious that the frame structure 3 can at least partly form simultaneously the cover surface 1 and/or the bottom surface 2 together with the cover structures. The CF card is equipped with a 50-pin connector P complying with the CFA standard.

FIGS. 4a–4d show some details of the cards according to the invention, wherein only those parts that are necessary for the invention are shown. In FIG. 4a, the antenna structure ANT is a T-antenna which is supplied by means of a lead L1. FIGS. 4a–4d show particularly leads L1–L4 to couple the antenna ANT electrically to a circuit board PCB inside the card and to couple the signal and/or the ground plane to the antenna ANT. In FIG. 4c, the antenna structure ANT is a plate IFA antenna which is coupled by leads L3 and L4 to the circuit board PCB inside the card. The circuit board PCB has electroconductive mating surfaces to which the spring lead is coupled as shown in FIG. 4b, which is a cross-section of the location A—A of FIG. 4a. The structure has the advantages of integratability, simplicity, and easy and quick assembly. By using several spring leads, both the ground plane (lead L3) and the signal (lead L4) can be coupled to the IFA antenna, as shown in FIG. 4c. The lead can extend in an integrated manner through the frame structure 3 or bypass it to the antenna ANT. As shown in FIG. 4d (a cross-section of the location A—A of FIG. 4a), the antenna ANT can also be supplied by means of a lead L2 separated physically from the antenna ANT. In this case, the antenna ANT and the lead L2 are arranged in such a way that they are coupled to each other by means of an electrical field. The lead L2 is further coupled electrically to the circuit board PCB by means of a spring part and is fixed to the frame structure 3. It is obvious that the number and placement of the leads vary according to the type of the antenna structure ANT used. It is also obvious that e.g. the lead L1 can be formed of a more rigid spring part and a flexible lead which are coupled to each other in a suitable manner.

It is obvious that the invention is not limited solely to the above-presented preferred embodiments of the invention but it may be modified within the scope of the claims.

What is claimed is:

1. A wireless communication card device, which is formed as an adapter to couple another card, having a smaller size, to an electronic device, and which card device comprises at least a cover surface and a bottom surface as well as a frame structure placed therebetween and edging said card device, and which card device further comprises at least an antenna structure wherein said antenna structure is integrated in said frame structure.

2. A wireless communication card device according to claim 1, wherein the antenna structure is fitted primarily on top of the outer surface of said frame structure.

3. A wireless communication card device according to claim 1, also comprising connector means formed in the frame structure for coupling into an electronic device, wherein the antenna structure is placed at the opposite end of the card device in relation to the connector means.

4. A wireless communication card device according to claim 1, inside which card device is fitted at least one circuit board, wherein the antenna structure is coupled to said circuit board by means of at least one spring lead.

5. A wireless communication card device according to claim 1, wherein it is designed at least partly as an expansion card complying with the PCMCIA standard.

6. A wireless communication card device according to claim 1, wherein it is designed at least partly as an expansion card complying with the CFA standard.

7. A wireless communication card device according to claim 1, also comprising connector means formed in the frame structure for coupling into an electronic device.

8. A wireless communication card device according to claim 1, wherein the antenna structure is fitted primarily inside said frame structure.

9. A wireless communication card device according to claim 1, wherein the antenna structure is arranged to couple to a lead through the frame structure by means of an electrical field.

10. A method in the manufacture of an expansion card for an electronic device, which expansion card is formed as an adapter to couple another card, having a smaller size, to said electronic device, and which expansion card comprises at least a cover surface and a bottom surface as well as a frame structure placed therebetween and edging said expansion card, and which expansion card further comprises at least an antenna structure, and said antenna structure in said frame structure.

11. A method according to claim 10, wherein the antenna structure is arranged to couple to a lead through the frame structure by means of an electrical field.

12. A method according to claim 10, wherein connector means are formed in the frame structure for coupling into an electronic device.

13. An expansion card for an electronic device, which expansion card is formed as an adapter to couple another card, having a smaller size, to said electronic device, and which expansion card comprises at least a cover surface and a bottom surface as well as a frame structure placed therebetween and edging said expansion card, and which expansion card further comprises at least an antenna structure, wherein said antenna structure is integrated in said frame structure.

14. An expansion card according to claim 13, wherein the antenna structure is arranged to couple to a lead through the frame structure by means of an electrical field.

15. An expansion according to claim 13, also comprising connector means formed in the frame structure for coupling into an electronic device.

* * * * *